(No Model.)

J. H. HENDRICK.
VEHICLE WHEEL.

No. 490,438. Patented Jan. 24, 1893.

Witnesses.

Inventor,
Joel H. Hendrick,
per Chapin & Co.
Attys.

UNITED STATES PATENT OFFICE.

JOEL H. HENDRICK, OF SPRINGFIELD, MASSACHUSETTS, ASSIGNOR TO THE WARWICK CYCLE MANUFACTURING COMPANY, OF SAME PLACE.

VEHICLE-WHEEL.

SPECIFICATION forming part of Letters Patent No. 490,438, dated January 24, 1893.

Application filed October 19, 1891. Serial No. 409,184. (No model.)

*To all whom it may concern:*

Be it known that I, JOEL H. HENDRICK, a citizen of the United States, residing at Springfield, in the county of Hampden and State of Massachusetts, have invented new and useful Improvements in Vehicle-Wheels, of which the following is a specification.

This invention has for its object the improvement of bicycle wheels, and the improvements more particularly relate to peculiar constructions of the rim, formed of two sections of sheet metal, whereby the rim is rendered both light and strong, capable of easy production, the formation and arrangement of the parts permitting the most effectual brazing in an unusually easy manner.

The improvements are illustrated in the accompanying drawings in which

Figure 1:
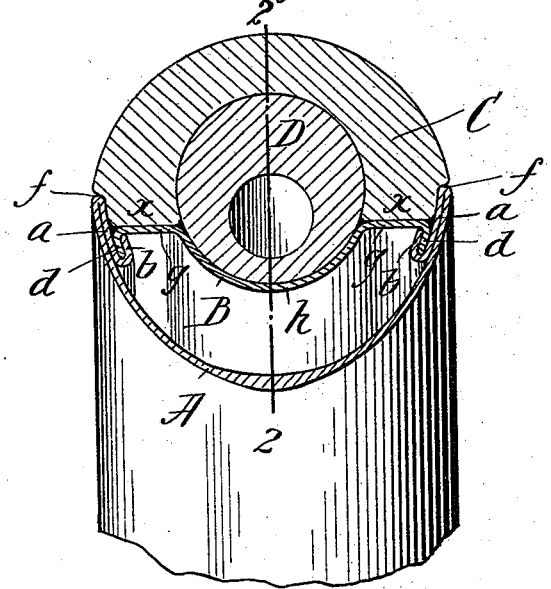
Figure 2:
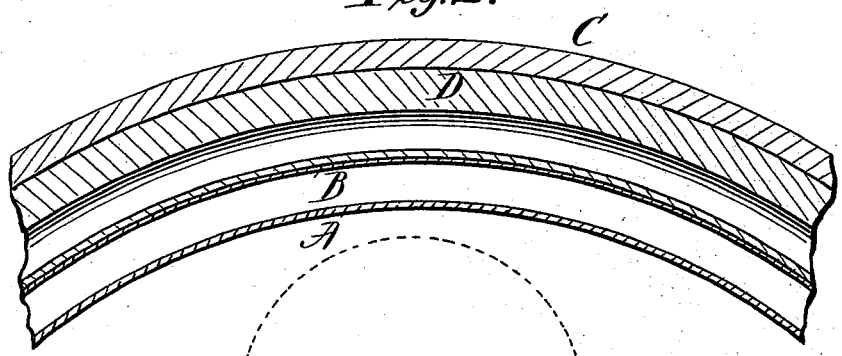
Figure 3:
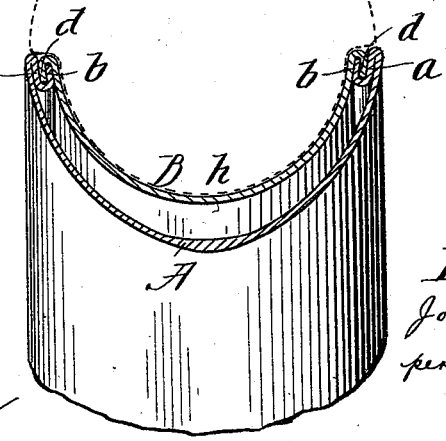

Figure 1 is an enlarged cross sectional view through the rim and tire; Fig. 2 is a section of same on a plane at right angles thereto, and as indicated by the line 2—2, Fig. 1, and on a smaller scale. Fig. 3 is a cross sectional view of the rim of slightly modified form.

The invention consists, essentially and specifically, of a rim embodying two sections of thin metal, one bent into trough shape with portions a short distance within its edges inwardly turned closely upon themselves, and the extreme edge portions reversely turned away from the axial center of the rim, substantially parallel with and slightly separated from the said inturned portions and constituting the inner walls of double outwardly opening annular grooves, and the other rim-section having its edge portions turned toward the rim axis to constitute at each side single hook-formed lips which have interlocking engagements in the said outwardly opening annular grooves of the first section, and are brazed therein on both sides thereof.

In the drawings, A represents the lower rim-section, and B, the upper rim-section. The lower section is first bent into U or trough-shape, and portions, $a\,a$, a short distance within the edges are then inwardly turned to lie closely along the inner side of the said section proper and the extreme edge portions are then reversely and upwardly turned to form the lips, $b\,b$, which are in more or less nearly vertical planes and slightly separated from the first mentioned inturned portions, $a$, leaving a narrow outwardly opening groove between the said portions, $a$ and $b$, at each side of the trough formed section A. The rim-section, B, is formed from a strip of thin metal which is considerably narrower than the one from which the section, A, is formed, and has its edge portions downwardly turned to form hook-shaped edge lips, $d\,d$, and these are entered into the said narrow groove between the portions, $a\,b$, of the section, A, and thereby the section, B, is supported on the other, A. Thus a double interlocking hook engagement is had between the said two rim sections whereby the one is efficiently supported upon or relative to the other and whereby a very strong rim is constructed which is not inconsistent with a lightness which at this day is practically requisite in rims for bicycle wheels. The inter-engaging grooved-formed and hooked lip-parts are united by brazing throughout their entire proximate surfaces; and the two sections are, as usual, bent into circular form and properly so retained by brazing as usual.

In Fig. 1 the hooked lips, $b$, terminate somewhere below the upper edges, $f$, of the rim-section, A, the edge portions of the section, B, being, consequently, supported somewhat below said edges, $f\,f$, and the said section, B, is adjacent the lips inwardly extended horizontally to form the annular rests, $g\,g$, and the intermediate portion of said section is of trough-form to constitute an annular seat depression, $h$, for the part, D, of the tire.

As shown in Fig. 1 the tire consists of the outer section, C, and the inner section, D, the said outer tire-section being of arch form, and is widened at its base, and thereby rests upon the said annular support, $g\,g$, the thickness of the said tire-section, C, decreasing toward the tread, being thereat comparatively thin and much more flexible than at the side base-portions, $x$. The outer tire-section formed and supported as described leaves an annular space between its inner concave side and the seat depression, $h$, in the rim-section, B, within which is placed the supplemental tire-section, D, which is a ring circular in cross section of compressible material, the same of course being applied on the rim before or at the time of placing thereon the outer tire-section, C. Both of said tire-sections are to be formed of india rubber or gutta percha in such conditions of vulcanization or in such elastic compounds thereof as may be deemed most suitable. The outer tire section is designed to be so flexible as to readily yield inwardly under a force less than that corresponding to the weight of the rider and the inner tire-section is to reinforce the outer one, at the same time yielding more or less as the outer tire-section is inwardly deflected. The outer section, C, is to be of firmer and harder substance than the inner, for resisting the effects in use for abrasion and wear. The inner tire-section, D, as shown, has an annular hole therein which may be concentric with the outer wall or it may, as here particularly shown, be toward the inner wall of the said section, B, leaving a greater sustaining body which however is of the greatest elasticity directly under the thinner tread portion of the outer tire-section, C.

The double portions of the rim-section, A, at and just below the edges, $f$ $f$, constitute lips for retaining the tire-section, C, against outward displacement, the ring, D, maintaining said section, C, against undue contraction or inner sidewise collapse.

In Fig. 3 the rim, while constructed substantially in accordance with features of this invention as above set forth, is, however, adapted for the reception of a tire of somewhat different cross sectional form as indicated by the dotted line. In this construction the seat depression, $h$, has its borders next to the hooked lip, $d$,—the rests, $g$ $g$, being dispensed with.

I am aware that at this time it is not broadly new to construct a vehicle wheel-rim of thin metal formed of two sections; and that it is not new to form a rim of trough shape in cross section with opposite rests and outer edge lips or flanges, and I am also aware that it is not broadly new to construct a vehicle wheel with an arch-shaped tire supported on a rim formed of thin metal, nor is it new to form the tire arch shaped and supported on the thin metal rim with a reinforcing body of compressible material supported by the tire and extended into the U-shaped depression under the outer tire section, and none of these constructions do I claim as my invention; but

What I claim and desire to secure by Letters Patent is as next specifically set forth, that is:—

The combination with the trough shaped section B having its extreme edges bent into hooked lips $d$, of the rim section A having the inturned portions $a$ lying against the inner curved surface of said section and bent at their edges into hooked lips $b$ located inside the inturned portions $a$ to form an open top groove into which the hooked lips $d$ can be set and brazed, and the elastic tire C resting in the trough shaped rim section B, substantially as described.

J. H. HENDRICK.

Witnesses:
  J. W. GARFIELD,
  WM. S. BELLOWS.